(12) United States Patent
Harrison et al.

(10) Patent No.: US 9,020,795 B2
(45) Date of Patent: Apr. 28, 2015

(54) MULTIPLE-ENTITY SCENARIO SIMULATION INCORPORATING HUMAN INTERACTION

(71) Applicant: Lockheed Martin Corporation, Bethesda, MD (US)

(72) Inventors: Gregory A. Harrison, Oviedo, FL (US); Randel A. Crowe, Interlachen, FL (US); Keith A. Stump, Winter Springs, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/908,482

(22) Filed: Jun. 3, 2013

(65) Prior Publication Data

US 2013/0268255 A1   Oct. 10, 2013

Related U.S. Application Data

(60) Continuation-in-part of application No. 12/908,597, filed on Oct. 20, 2010, now Pat. No. 8,457,942, which is a division of application No. 11/690,349, filed on Mar. 23, 2007, now abandoned.

(60) Provisional application No. 61/788,993, filed on Mar. 15, 2013, provisional application No. 60/785,257, filed on Mar. 23, 2006.

(51) Int. Cl.
*G06F 17/50* (2006.01)
*G06N 3/00* (2006.01)

(52) U.S. Cl.
CPC ........ *G06F 17/5009* (2013.01); *G06F 17/5095* (2013.01); *G06N 3/006* (2013.01); *G06F 2217/04* (2013.01); *G06F 2217/10* (2013.01)

(58) Field of Classification Search
USPC .......................................................... 703/13
See application file for complete search history.

(56) References Cited

U.S. PATENT DOCUMENTS

| | | | | |
|---|---|---|---|---|
| 4,922,413 A * | 5/1990 | Stoughton et al. | ............... | 712/26 |
| 5,506,794 A | 4/1996 | Lange | | |
| 6,106,297 A * | 8/2000 | Pollak et al. | ..................... | 434/16 |
| 7,315,801 B1 | 1/2008 | Dowd et al. | | |
| 7,349,863 B1 | 3/2008 | Pena-Mora et al. | | |
| 2002/0194393 A1 * | 12/2002 | Hrischuk et al. | ............... | 709/318 |

(Continued)

OTHER PUBLICATIONS

Fujimoto, R., "RTI-Kit V 0.2 Specification", Mar. 18, 1998, 18 pages.

(Continued)

*Primary Examiner* — Dwin M Craig
(74) *Attorney, Agent, or Firm* — Withrow & Terranova, PLLC

(57) ABSTRACT

Mechanisms for incorporating a human into an automated multiple-entity scenario simulation are disclosed. A Petri-net message processor function (PMPF) receives a first Petri-net message from a source activity node function (ANF). The Petri-net message includes a simulation activity identifier that identifies a first simulation activity. The PMPF routes the first Petri-net message to a first ANF based on the simulation activity identifier. The first ANF receives the first Petri-net message and provides a message to a user based on the first Petri-net message. A response is received from the user. A second Petri-net message is generated based on the response and is communicated to a destination ANF to trigger a second simulation activity by the destination ANF.

15 Claims, 8 Drawing Sheets

(56) References Cited

U.S. PATENT DOCUMENTS

2003/0078138 A1   4/2003   Toyama
2005/0262397 A1   11/2005  Fitzgerald et al.

OTHER PUBLICATIONS

Fujimoto, R., et al., "HLA RTI Performance in High Speed LAN Environments," Defence Evaluation and Research Agency, British Crown Copyright, 1998, 11 pages.

Pawlowski, Tom et al., "Applying Executable Architectures to Support Dynamic Analysis of C2 Systems," C2 Assessment Tools & Metrics Track, The MITRE Corporation, Jun. 2004, Command and Control Research and Technology Symposium, Jun. 2004, 39 pages.

Author Unknown, "FDK—Federated Simulations Development Kit", Georgia Tech Research Corporation, Jul. 20, 1998, updated Jan. 11, 2001, http://www.cc.gatech.edu/computing/pads/fdk.html, accessed Mar. 9, 2007, 12 pages.

Wang, B., et al., "A Petri Net Simulation Kernel With Extendibility, Convenient Modeling and Fast Simulation Engine," Proceedings of ICCT2003 (International Conference on Communication Technology), Apr. 9-11, 2003, accessed Sep. 28, 2009, pp. 1537-1539.

Non-final Office Action for U.S. Appl. No. 12/908,597 mailed Jul. 23, 2012, 10 pages.

Notice of Allowance for U.S. Appl. No. 12/908,597 mailed Jan. 18, 2013, 7 pages.

Non-final Office Action for U.S. Appl. No. 11/690,349 mailed Oct. 1, 2009, 10 pages.

Final Office Action for U.S. Appl. No. 11/690,349 mailed May 20, 2010, 10 pages.

\* cited by examiner

MULTIPLE-ENTITY SCENARIO SIMULATION INCORPORATING HUMAN INTERACTION

RELATED APPLICATIONS

This application claims priority to U.S. Provisional Patent Application Ser. No. 61/788,993, "DISTRIBUTED SIMULATION WITH AUDIBLE INTERACTION," filed Mar. 15, 2013, and to U.S. patent application Ser. No. 12/908,597, "EXERCISE MONITORING UNIT FOR EXECUTABLE ARCHITECTURES," filed Oct. 20, 2010, which is a divisional patent application of U.S. patent application Ser. No. 11/690,349, "EXERCISE MONITORING UNIT FOR EXECUTABLE ARCHITECTURES," filed Mar. 23, 2007, which is a non-provisional patent application of U.S. Patent Application Ser. No. 60/785,257, "EXERCISE MONITORING UNIT FOR EXECUTABLE ARCHITECTURES," filed Mar. 23, 2006, the disclosures of which are hereby incorporated herein by reference in their entireties.

TECHNICAL FIELD

The embodiments relate generally to simulations, and in particular to incorporating a human into a multiple-entity scenario simulation utilizing Petri-net messaging.

BACKGROUND

Simulating a scenario involving multiple different entities may be desirable for process improvement purposes, and the like. Generally such simulations involve conditional processing wherein at least some activities cannot be simulated prior to the occurrence of other activities. For example, before a dispatcher can dispatch a fire truck to a fire, the dispatcher must first have determined the location of the fire. Setting up multiple-entity scenario simulations that accurately reflect such conditions can be difficult and time-consuming. Typically such simulations are completely automated and programmed for a particular purpose, requiring extensive development time, and can therefore be costly. Such programming may involve ensuring that the activities occur in a proper sequence, as well as in parallel, and that the timing between activities is accurate.

At times it may be desirable to incorporate a human into an automated multiple-entity scenario simulation. Integrating a human into an automated multiple-entity scenario simulation may be useful, for example, for monitoring actual response times of one or more humans to various stimuli that may occur during a multiple-entity scenario simulation, for training purposes, and the like. Accordingly, there is a need for mechanisms for incorporating humans into multiple-entity scenario simulations.

SUMMARY

The embodiments relate to incorporating a human into a multiple-entity scenario simulation that uses Petri-net messaging to trigger simulation activities among the various entities being simulated. In one embodiment, a Petri-net message processor function (PMPF) receives a first Petri-net message from a source activity node function (ANF). The Petri-net message includes a simulation activity identifier that identifies a simulation activity. The PMPF routes the first Petri-net message to a first ANF based on the simulation activity identifier. The first ANF receives the first Petri-net message and in response to receipt of the first Petri-net message provides a message to a user (e.g., a participant). The first ANF receives from the user a response to the message. Based on the response, the first ANF generates a second Petri-net message and communicates the second Petri-net message to a destination ANF to trigger a simulation activity by the destination ANF.

In one embodiment, the first ANF determines that the receipt of the first Petri-net message places the first ANF into an enabled state. Being placed into the enabled state triggers the first ANF to provide the message to the user. In one embodiment, the first Petri-net message comprises a final Petri-net message of a plurality of Petri-net messages that are necessary to be received by the first ANF to place the first ANF in the enabled state. Subsequent to communicating the second Petri-net message to the destination ANF, the first ANF may place the first ANF into a wait state.

In one embodiment, a simulator implements a first plurality of ANFs, each ANF in the first plurality of ANFs being associated with an entity of a plurality of entities in a multiple-entity scenario simulation. The PMPF routes the first Petri-net message to the first ANF of the first plurality of ANFs based on the simulation activity identifier. The simulator may receive a third Petri-net message from the source ANF that includes a second simulation activity identifier that identifies a second simulation activity. The PMPF routes the third Petri-net message to a second ANF of the first plurality of ANFs based on the second simulation activity identifier. Thus, the PMPF routes Petri-net messages to different ANFs in the first plurality of ANFs based on the identified simulation activity.

The receipt of the second Petri-net message may cause the second ANF to become enabled, and therefore trigger the second ANF to provide a second message to the user. The second message differs from the first message. The second ANF receives from the user a second response to the second message. The second ANF generates a fourth Petri-net message based on the second response, and communicates the fourth Petri-net message to a destination ANF to trigger a subsequent simulation activity.

In one embodiment, the first ANF receives an audible question from the user prior to receiving the first response. The first ANF provides an audible answer to the user based on the audible question. Thus, the first ANF is able to simulate realistic exchanges with the user during the simulation. In one embodiment, the destination ANF is identified by the user in the audible response.

In one embodiment, the ANF communicates an audible message to the user and receives audible responses from the user in response to the audible message.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
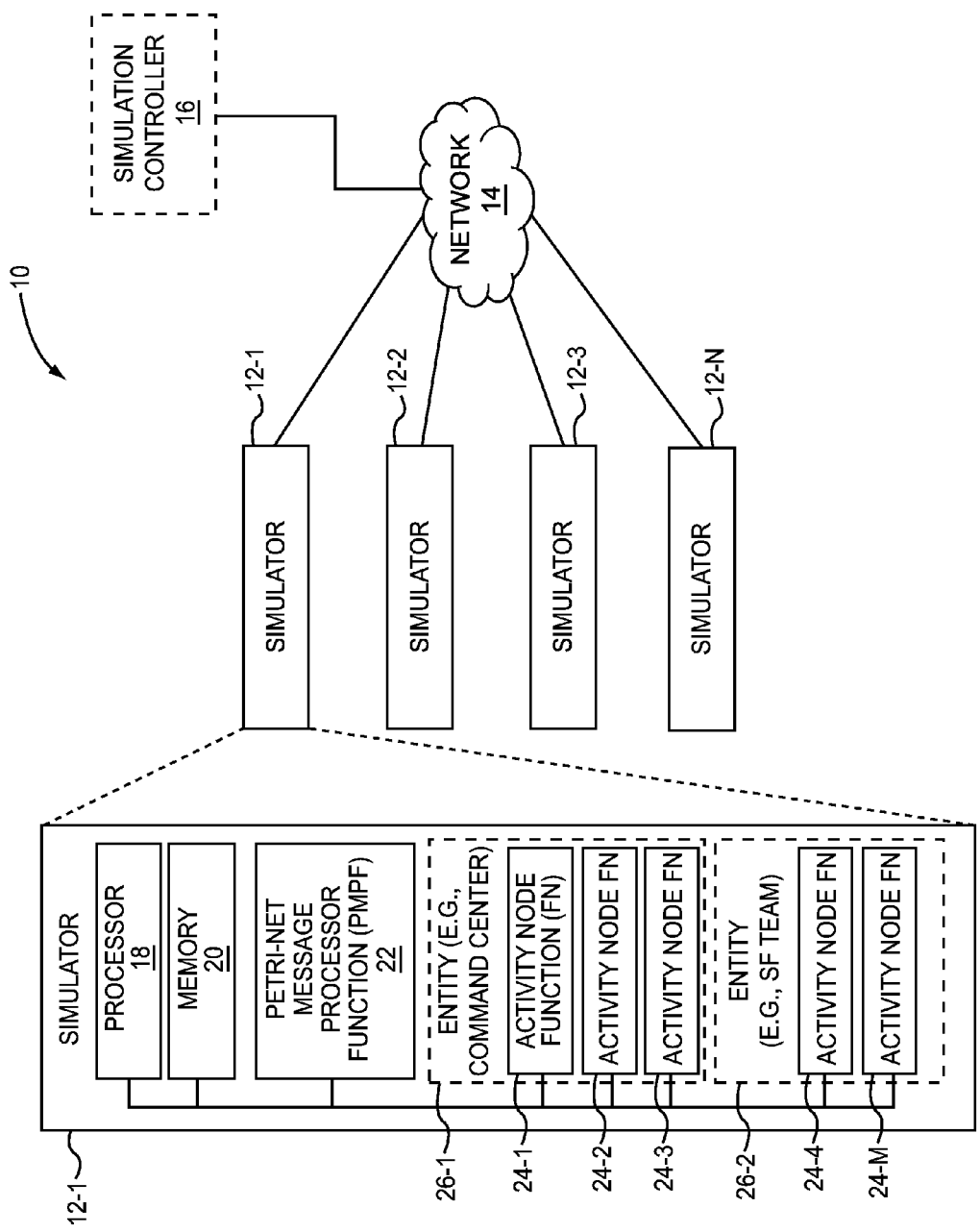
FIG. 1 is a block diagram of a simulation system in which embodiments may be practiced according to one embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present embodiments relate to incorporating a human into an automated multiple-entity scenario simulation that utilizes Petri-net messaging. The phrase "entity" refers to an actor that is simulated in the multiple-entity scenario simulation, and may comprise an individual, an agency, a team of individuals, an object such as a vehicle, or the like. In general, an entity may be any desired level of granularity based on the particular scenario being simulated. For example, a single entity may represent a group of individuals, or each individual in the group may be represented by a different entity.

In one embodiment, the automated multiple-entity scenario simulation may be referred to as a federated executable architecture. "Federated" refers to an ability to integrate simulators into a simulation through a standardized protocol, such as the High-Level Architecture (HLA). Such simulators may be heterogeneous simulators such as continuous constructive simulators, discrete event simulators and virtual simulators. The use of multiple heterogeneous simulators may be desirable in automated multiple-entity scenario simulations for a number of reasons, including that different simulators may be configured to simulate certain activities associated with one or more particular entities. For example, an agency, such as a fire department, may possess a simulator that is configured to simulate certain activities of a fire department, such as interactions between a driver of a fire truck and a fire department command-and-control operator. Another agency, such as a medical emergency agency, that may be simulated in the multiple-entity scenario simulation may possess a simulator that is configured to simulate certain activities of the medical emergency agency.

Federation may be accomplished, in some embodiments, through the use of one or more messaging layers that implement a desired messaging protocol. Among other functions, the messaging protocol may ensure uniformity of message structure, irrespective of the particular simulator to which the message is addressed or from which simulator the message is generated.

The phrase "executable architecture" refers to the simulation of a multiple-entity scenario based on a defined static architecture that describes a human social, organizational, or other type of shared mission, such as a Command, Control, Communications, Computers, Intelligence, Surveillance and Reconnaissance (C4ISR) mission. The defined static architecture may be based on any desirable format. The defined static architecture may depict, for example, a set of operational activities in an event sequence diagram with identified information element flows between the activities. Such defined static architecture may be embodied, for example, in an OV-6c Operation Event Trace Description (Department of Defense Architecture Framework (DoDAF)) or in a Business Process Model Notation (BPMN) diagram. In BPMN terminology, "swimlanes" correspond to entities discussed herein, and "operational activities" correspond to activity node functions discussed herein. The embodiments automate the defined static architecture to form an executable architecture, which, among other advantages, facilitates "what if" types of analysis, and timing analyses, by observing the behavior of the simulated scenario with different input stimuli.

The present embodiments utilize Petri-net messaging to trigger activities during a multiple-entity scenario simulation. The embodiments include activity node functions (ANFs) that simulate the simulation activities that occur during the multiple-entity scenario simulation. Multiple ANFs may be associated with the same entity in the simulation. In one embodiment, an ANF is in a wait, or disabled, state, until the receipt of one or more Petri-net messages places the ANF into an enabled state. The enabled state triggers the ANF to simulate one or more particular simulation activities in the simulation, and to then generate and send another Petri-net message to a downstream ANF to trigger another simulation activity. The ANF may then go back into the wait state. Thus, the multiple-entity scenario simulation progresses based on the communication of Petri-net messages from one ANF to another ANF. Some ANFs may not transmit messages, and may stimulate no further processing, after having performed a desired simulation event.

In some embodiments, the multiple-entity scenario simulation may be run "faster than real-time" or "slower than real-time" by controlling the distribution of messages from one ANF to another ANF.

The embodiments facilitate the integration of one or more humans into such an automated multiple-entity scenario simulation. Integrating a human into such a simulation may be useful for a variety of reasons, such as, for example, training purposes, observation purposes, process optimization purposes, to determine how humans generally react under particular circumstances, or the like.

FIG. 1 is a block diagram of a simulation system 10 in which embodiments may be practiced, according to one embodiment. The simulation system 10 includes one or more simulators 12-1-12-N (generally, simulators 12). Each simulator 12 may comprise the same type of simulator, or may comprise a different type of simulator. For example, the simulator 12-1 may comprise a discrete simulator and the simulator 12-2 may comprise a continuous simulator. The simulators 12 are communicatively coupled to a network 14 to facilitate communications between the simulators 12. Generally, and as will be described in greater detail herein, the simulators 12 communicate via Petri-net messages which trigger the simulation of activities.

The simulators 12 may communicate Petri-net messages directly from one simulator 12 to another simulator 12, or in some embodiments, the simulators 12 may communicate Petri-net messages indirectly through a simulation controller 16. The simulation controller 16 may provide functionality that includes, for example, the ability to alter the timing of messages from one simulator 12 to another simulator 12, for implementing faster-than-real-time simulations or slower-than-real-time simulations. The simulation controller 16 may also, for example, initiate a multiple-entity scenario simulation by communicating a first Petri-net message to a particular simulator 12. While for purposes of illustration the simulation controller 16 is depicted as a separate element communicatively coupled to the simulators 12 via the network 14, in other embodiments, functionality of the simulation controller 16 may be implemented on each simulator 12 individually. The use of ordinals herein, such as "first" or "second" is solely for ease of distinguishing different elements among multiple elements, such as a first simulator 12 and a second simulator 12, and does not imply a priority, importance, or any other characteristic unless explicitly stated herein.

The simulators 12 may include a processor 18 and a memory 20. The memory 20 may include programming instructions that configure the processor 18 to implement functionality described herein. Such functionality may include a Petri-net message processor function (PMPF) 22. The PMPF 22 receives Petri-net messages, and based on the content of the Petri-net messages, routes the Petri-net messages to one or more activity node functions (ANFs) 24-1-24-M (generally, ANFs 24). The PMPF 22 may also perform additional functionality, such as ensuring that a Petri-net message destined for a particular ANF 24 originated from a particular ANF 24, or from one of a group of particular ANFs 24, prior to routing the Petri-net message to the destination ANF 24.

Each ANF 24 may be associated with a particular entity 26-1-26-2 (generally, entities 26), that is being simulated on the respective simulator 12. For example, the simulator 12-1 may simulate an entity 26-1, which may represent, for example, a command center that performs certain simulation activities during a multiple-entity scenario simulation. The entity 26-1 has associated therewith a first plurality of ANFs 24-1-24-3, each of which, when enabled, simulates a particular activity during the simulation. The simulator 12-1 may also simulate an entity 26-2, which may represent, for example, a special forces team. The entity 26-2 has associated therewith a second plurality of ANFs 24-4-24-M, each of which, when enabled, simulates a particular activity during the simulation.

While for purposes of illustration the simulator 12-1 is depicted as simulating two entities 26, a simulator 12 may simulate only a single entity 26, or may simulate any number of entities 26. Similarly, an entity 26 may have a single ANF 24 associated therewith, or may have any number of ANFs 24 associated therewith, depending on the number of different activities of the respective entity 26 that will be simulated during the multiple-entity scenario simulation.

While for purposes of illustration the PMPF 22 and ANFs 24 are illustrated as separate components, in other embodiments, the functionality ascribed to the PMPF 22 and ANFs 24 herein may be implemented in a single component, or may be otherwise divided into any other number of components. The functionality implemented by the PMPF 22 and ANFs 24 may also be described herein as being performed by the respective simulator 12, in view of the simulator 12 being a processing device that implements the described functionality irrespective of the particular manner in which it is implemented.

The simulators 12-2-12-N may include similar components and/or functionality described herein with respect to the simulator 12-1. In particular, each such simulator 12-2-12-N simulates at least one entity 26 in the simulation, implements a PMPF 22 for the routing of Petri-net messages, and implements one or more ANFs 24, each of which, when enabled, simulates an activity associated with an entity 26.

Figure 2:
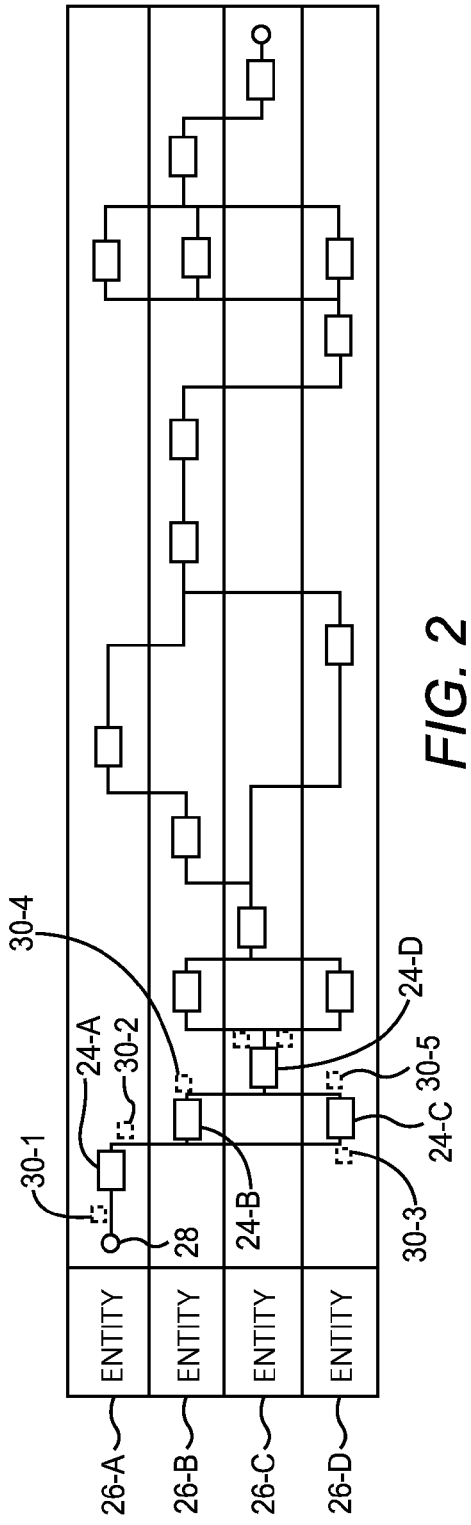
FIG. 2 is a block diagram illustrating Petri-net message flow among activity node functions (ANFs) in an example multiple-entity scenario simulation according to one embodiment.

FIG. 2 is a block diagram illustrating a Petri-net message flow among ANFs 24 in an example multiple-entity scenario simulation according to one embodiment. Assume for purposes of illustration that each entity 26-A-26-D is simulated by a different simulator 12. At an initiation 28 of the multiple-entity scenario, a Petri-net message 30-1 is routed to an ANF 24-A. The simulator 12 that implements the entity 26-A may be programmed to generate the Petri-net message 30-1 upon request, or the Petri-net message 30-1 may be communicated to such simulator 12 for routing to the ANF 24-A by another device, such as the simulation controller 16 (FIG. 1). Assume for purposes of illustration that the Petri-net message 30-1 enables the ANF 24-A. Upon being enabled, the ANF 24-A performs a simulation activity. The processing done by the ANF 24-A may depend on the actual activity being simulated. In one embodiment, an activity may be simulated by delaying the communication of a downstream Petri-net message for a particular amount of time. For example, a simulation activity may be the flight of an airplane from point A to point B. To simulate such activity, the ANF 24-A may wait a predetermined amount of time that simulates the amount of time for an airplane to fly from point A to point B. At the end of the simulation of the activity, the ANF 24-A generates a Petri-net message 30-2 and communicates the Petri-net message 30-2 to an ANF 24-B, and generates a Petri-net message 30-3 and communicates the Petri-net message 30-3 to an ANF 24-C.

The terms "source" and "destination," or "upstream" and "downstream," may be used herein to describe elements, such as a particular simulator 12 or a particular ANF 24, relative to another element during the communication of Petri-net messages 30. For example, the ANF 24-A may be referred to as a source ANF 24-A relative to the communication of the Petri-net message 30-2 to the ANF 24-B, because the ANF 24-A originated (i.e., was the source of) the Petri-net message 30-2. The ANF 24-B may be referred to as the destination ANF 24-B with respect to the Petri-net message 30-2. It should be apparent that the phrases "source" and "destination" in this context are relative to particular Petri-net messages 30, and that a source ANF 24 for one Petri-net message 30 may be a destination ANF 24 for another Petri-net message 30.

The ANF 24-B receives the Petri-net message 30-2. Assume for purposes of illustration that the receipt of the Petri-net message 30-2 enables the ANF 24-B, and thus triggers the ANF 24-B to simulate the activity identified in the Petri-net message 30-2. Assume further for purposes of illustration that the simulation activity takes a duration of 4 seconds, and upon completion of the simulation activity, the ANF 24-B generates a Petri-net message 30-4 and communicates the Petri-net message 30-4 to an ANF 24-D associated with an entity 26-C. Assume further for purposes of illustration that the receipt of the Petri-net message 30-3 enables the ANF 24-C, and thus triggers the ANF 24-C to simulate the simulation activity identified in the Petri-net message 30-3. Assume for purposes of illustration that the simulation activity takes a duration of 8 seconds, and upon completion of the simulation activity, the ANF 24-C generates a Petri-net message 30-5 and communicates the Petri-net message 30-5 to the ANF 24-D.

Assume for purposes of illustration that the ANF 24-D is not enabled until both the Petri-net message 30-4 and the Petri-net message 30-5 are received. Thus, upon receipt of the Petri-net message 30-4, the ANF 24-D remains in a wait, or disabled, state. Upon receipt of the Petri-net message 30-5, however, the ANF 24-D becomes enabled, and is triggered to perform a simulation activity.

In a manner similar to that described with respect to the ANFs 24-A-24-D, the process of receiving Petri-net messages 30 by ANFs 24, simulating activities in response to the receipt of one or more Petri-net messages 30, and generating and communicating downstream Petri-net messages 30 may continue through a plurality of ANFs 24 until a final simulation activity is performed, based on the particular multiple-entity scenario being simulated.

Figure 3:
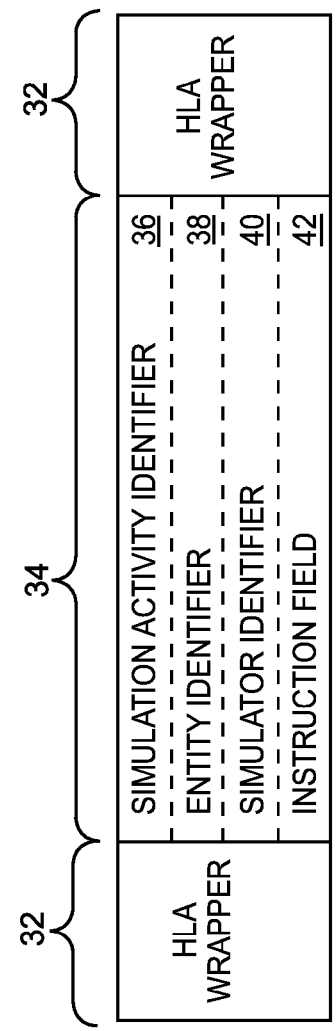
FIG. 3 is a block diagram of a Petri-net message according to one embodiment.

FIG. 3 is a block diagram of a Petri-net message 30 according to one embodiment. The Petri-net message 30 may include HLA wrapper portions 32, which facilitates interoperability among multiple and even heterogenous simulators 12. The Petri-net message 30 may also include a payload portion 34 that includes a simulation activity identifier 36 that identifies a particular simulation activity. The Petri-net message 30 may also include an entity identifier 38 that identifies a particular entity 26 with which the particular simulation activity is associated. A simulator identifier 40 may be used to identify the particular simulator 12 that implements the ANF 24 that simulates the simulation activity identified by the simulation activity identifier 36. An instruction field 42 may include data used by an ANF 24 for any desired purpose, depending on the respective ANF 24. In some embodiments, as discussed in greater detail herein, the instruction field 42 may include instructions that may be audibly provided to a user for during a simulation.

In operation, the PMPF 22 of a respective simulator 12, upon receipt of a Petri-net message 30, may utilize the simulation activity identifier 36 contained in the payload portion 34 of a Petri-net message 30 to route the Petri-net message 30 to a particular ANF 24 of a plurality of ANFs 24 that may be implemented by the simulator 12.

Figure 4:
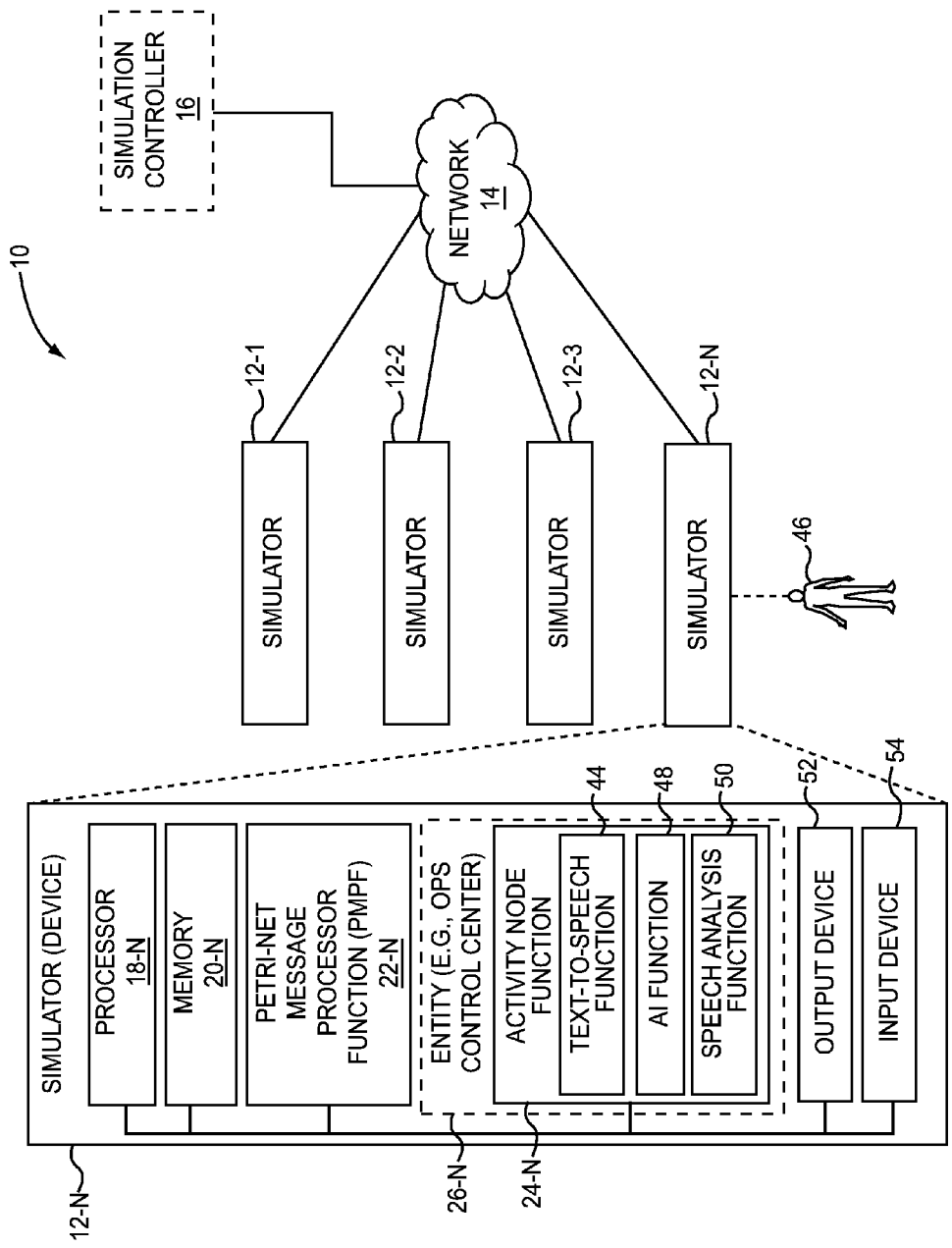
FIG. 4 is a block diagram of the simulation system according to another embodiment.

FIG. 4 is a block diagram of the simulation system 10 according to another embodiment. In this embodiment, one or more of the simulators 12 facilitates the incorporation of a human into an automated multiple-entity scenario simulation. In particular, the simulator 12-N, similar to the simulator 12-1, may include a processor 18-N, a memory 20-N, and a PMPF 22-N. The simulator 12-N may simulate the activity of an entity 26-N, which may represent, for example, an operations control center in a particular multiple-entity scenario simulation. The simulator 12-N includes an ANF 24-N, which includes a text-to-speech function 44. The text-to-speech function 44 may facilitate, for example, the presentation of an audible message to a user 46 that is incorporated into the multiple-entity scenario simulation. An artificial intelligence (AI) function 48 may facilitate the ability for the ANF 24-N to engage in interactions with the user 46 during the simulation. For example, the AI function 48 may, in response to a variety of questions, such as "Where am I?," "Can you repeat that?," "Who sent me this message?," provide accurate responses to provide a realistic simulation environment for the user 46 during the simulation.

A speech analysis function 50 may facilitate the receipt of audible responses from the user 46, and translate such audible responses into text, instructions, commands, or the like. As will be described in greater detail herein, the output of the speech analysis function 50 may trigger the conclusion of the simulation activity, and the generation and communication of a downstream Petri-net message 30 by the ANF 24-N.

One or more output devices 52, such as a headset, display, speakers, or the like, may provide messages and responses to the user 46. One or more input devices 54, such as a microphone, a mouse, or the like, may facilitate the receipt of speech or other input from the user 46.

While the embodiments are illustrated herein in the context of audible messages being provided to the user 46 based on the receipt of Petri-net messages, and receiving audible responses from the user 46, the embodiments are not limited to audible messages and audible responses, and have applicability to any mechanism for interacting with the user 46, such as via gestures, a mouse, the selection of one or more buttons, or any other output and/or input device.

While for purposes of illustration only the simulator 12-N has been depicted as being configured to facilitate the introduction of a human into a multiple-entity scenario simulation, the embodiments are not limited to the incorporation of a single user 46 into a multiple-entity scenario simulation. For example, each of the simulators 12-1-12-3 may be configured in a manner similar to that discussed herein with regard to the simulator 12-N, and each of the simulators 12-1-12-3 may be capable of facilitating the incorporation of a different user 46 into the same multiple-entity scenario simulation.

Figure 5:
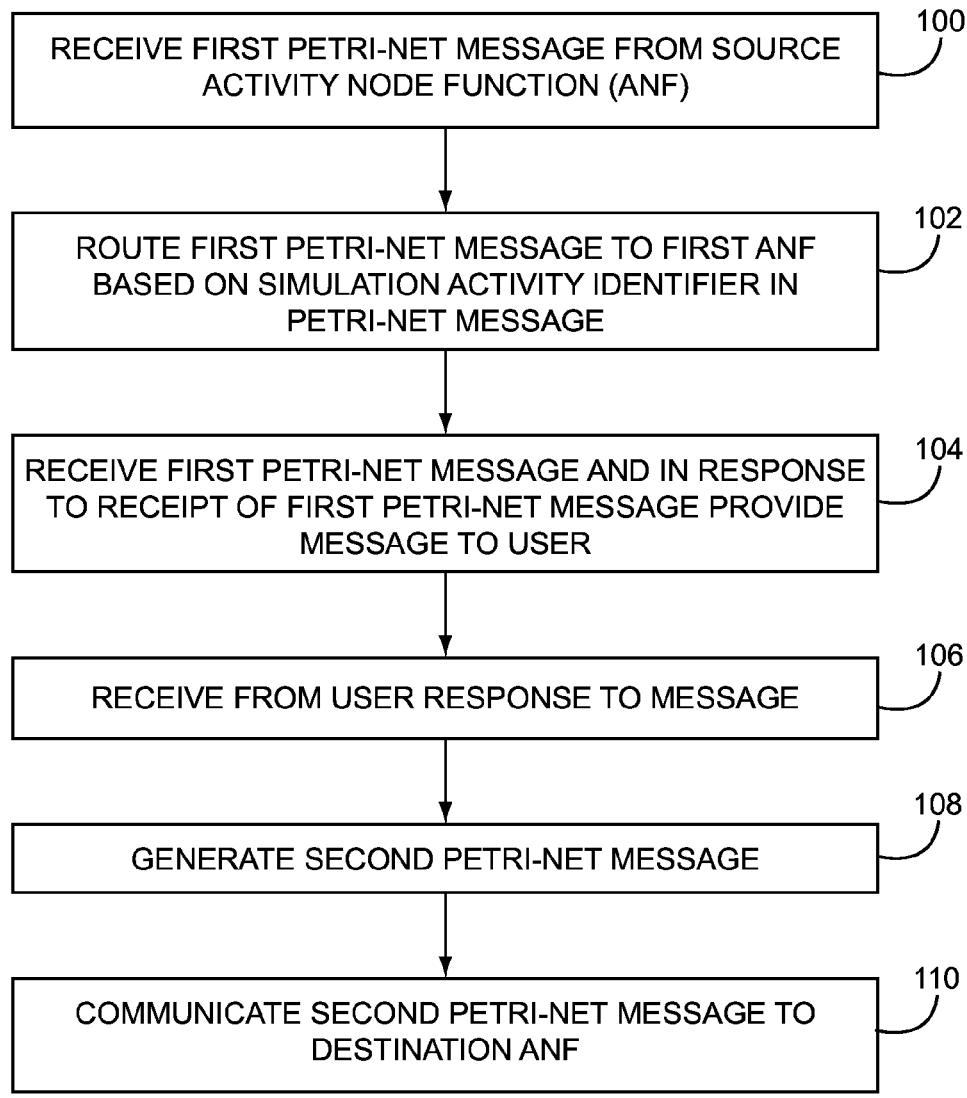
FIG. 5 is a flowchart of a method for incorporating a user into an automated multiple-entity scenario simulation according to one embodiment.

FIG. 5 is a flowchart of a method for incorporating a user into an automated multiple-entity scenario simulation according to one embodiment. FIG. 5 will be discussed in conjunction with FIG. 4. In this example, assume for purposes of illustration that the simulator 12-N receives a first Petri-net message 30-1 from a source ANF 24, such as the ANF 24-1 implemented by the simulator 12-1 (FIG. 1), which is destined for the ANF 24-N (FIG. 5, block 100). However, it should be noted that the source ANF 24 need not necessarily be implemented by a different simulator 12. Thus, in some embodiments, the simulator 12-N may simulate multiple entities 26, and the source ANF 24-1 and the destination ANF 24-N may be implemented by the same simulator 12-N.

The PMPF 22-N routes the first Petri-net message 30 to the ANF 24-N based on information contained in the first Petri-net message 30 (FIG. 5, block 102). For example, the PMPF 22-N may access the simulation activity identifier 36 in the first Petri-net message 30, and based on the simulation activity identifier 36, route the first Petri-net message 30 to the ANF 24-N. As discussed previously, while the simulator 12-N is depicted as implementing only a single ANF 24 for purposes of illustration, in practice the simulator 12-N may implement any number of ANFs 24, and thus, the PMPF 22-N routes the first Petri-net message 30 to the particular ANF of a plurality of ANFs 24 based on the simulation activity identifier 36.

The ANF 24-N receives the first Petri-net message 30, and in response to the receipt of the first Petri-net message 30, provides a message to the user 46 (FIG. 5, block 104). In this example, the receipt of the first Petri-net message 30 was sufficient to enable the ANF 24-N, and thus trigger the interaction with the user 46. Other simulated activities may require the receipt of a plurality of Petri-net messages 30 before the respective ANF 24 is enabled.

The message may be generated based on additional information contained in the first Petri-net message 30, such as information contained in the instruction field 42. For example, the instruction field 42 may include a textual string that is audibly presented to the user 46 via the text-to-speech function 44. The message may provide instructions to the user 46, or may prompt the user 46 to select a particular course of action of a plurality of different actions. The user 46 may then respond to the message with a response. In particular, the user 46 may select a particular course of action from a plurality of actions with which the user 46 was presented.

The ANF 24-N receives the response from the user 46 (FIG. 5, block 106). Based on the response, the ANF 24-N generates a second Petri-net message 30 (FIG. 5, block 108). The ANF 24-N communicates the second Petri-net message 30 to a destination ANF 24 (FIG. 5, block 110). The destination ANF 24 may be implemented by the simulator 12-N, or may be implemented by a different simulator 12, such as the simulator 12-2. The particular destination ANF 24 to which the second Petri-net message 30 is communicated may be based, in one embodiment, on the audible response received from the user 46. This direction may be implicit, or explicit. For example, a particular choice made by the user 46 may implicitly determine the ANF 24 to which the second Petri-net message 30 is communicated. Alternatively, the user 46 may explicitly indicate that the second Petri-net message 30 is to be communicated to a particular ANF 24. Thus, the embodiments incorporate the user 46 into an automated multiple-entity scenario simulation that utilizes Petri-net messaging.

Figure 6:
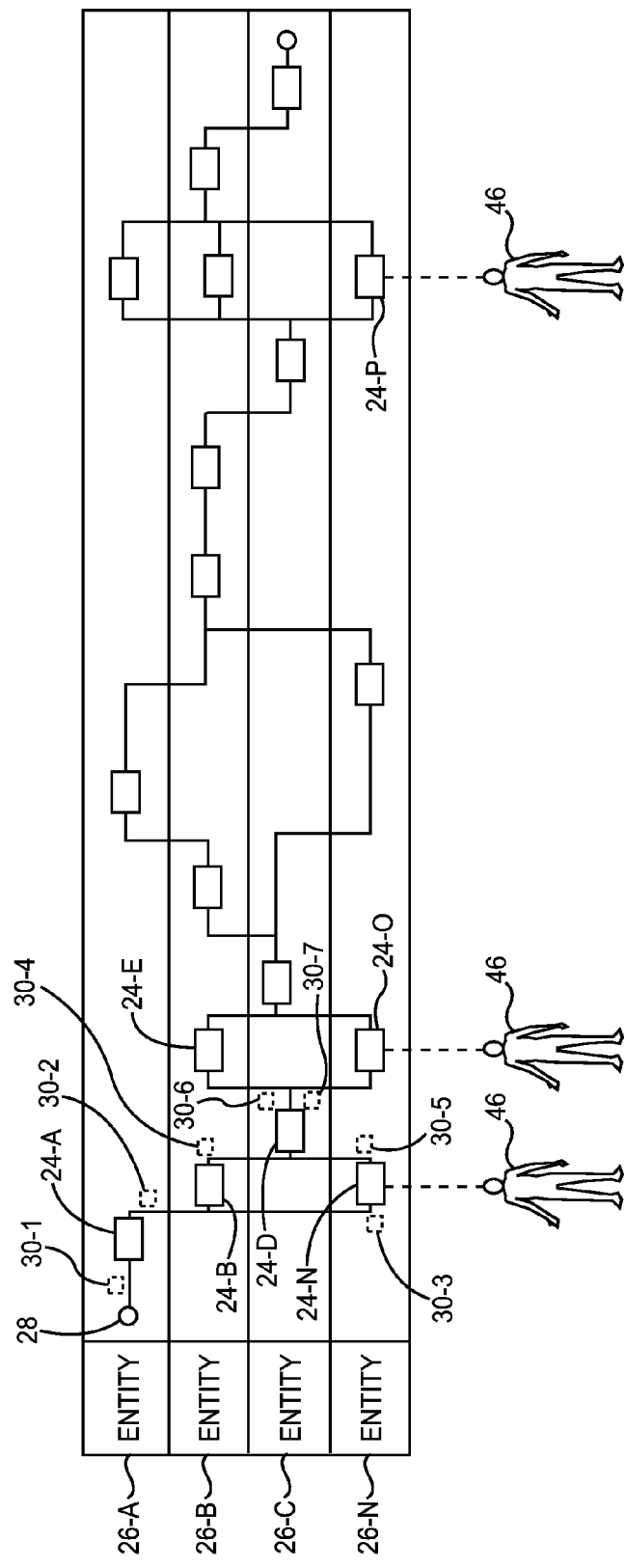
FIG. 6 is a block diagram illustrating Petri-net message flow among ANFs in an example multiple-entity scenario simulation in which a user is integrated into the multiple-entity scenario simulation according to one embodiment.

FIG. 6 is a block diagram illustrating a Petri-net message flow among ANFs 24 in an example multiple-entity scenario simulation in which a user 46 is integrated into the multiple-entity scenario simulation according to one embodiment. Assume for purposes of illustration that each entity 26-A-26-N is simulated by a different simulator 12. The entity 26-N is simulated by the simulator 12-N discussed above with regard to FIG. 4. At an initiation 28 of the multiple-entity scenario, a Petri-net message 30-1 is routed to the ANF 24-A. The simulator 12 that implements the entity 26-A may be programmed to generate the Petri-net message 30-1 upon request, or the Petri-net message 30-1 may be communicated to such simulator 12 for routing to the ANF 24-A by another device, such as the simulation controller 16 (FIG. 1). Assume for purposes of illustration that the Petri-net message 30-1 enables the ANF 24-A. Upon being enabled, the ANF 24-A performs a simulation activity. At the end of the simulation of the activity, the ANF 24-A generates a Petri-net message 30-2 and communicates the Petri-net message 30-2 to the ANF 24-B, and generates a Petri-net message 30-3 and communicates the Petri-net message 30-3 to the ANF 24-N. The ANF 24-B receives the Petri-net message 30-2. Assume further for purposes of illustration that the receipt of the Petri-net message 30-2 enables the ANF 24-B, and thus triggers the ANF 24-B to simulate the activity identified in the Petri-net message 30-2. Upon completion of the simulation of the activity, the ANF 24-B generates a Petri-net message 30-4 and communicates the Petri-net message 30-4 to an ANF 24-D associated with an entity 26-C.

The ANF 24-N receives the Petri-net message 30-3. Assume for purposes of illustration that the receipt of the Petri-net message 30-3 enables the ANF 24-N. The ANF 24-N provides an audible message to the user 46. The audible message may be based on information contained in the instruction field 42 of the Petri-net message 30-3. The ANF 24-N receives an audible response from the user 46, and based on the audible response, generates a downstream Petri-net message 30-5, and communicates the downstream Petri-net message 30-5 to the ANF 24-D. The ANF 24-N may then go into a wait, or disabled, state, awaiting the receipt of another Petri-net message 30.

The ANF 24-D may simulate a simulation action identified in the Petri-net message 30-5, and upon completion of the simulation of the simulation action generate and send a Petri-net message 30-6 to an ANF 24-E and a Petri-net message 30-7 to an ANF 24-O. Assume for purposes of illustration that the ANF 24-O is also implemented by the simulator 12-N. The ANF 24-O is associated with the entity 26-N, and thus both the ANF 24-N and the ANF 24-O are associated with the entity 26-N. The ANF 24-O, however, simulates a different simulation activity than the ANF 24-N. The ANF 24-O receives the Petri-net message 30-7. Assume further for purposes of illustration that the receipt of the Petri-net message 30-7 enables the ANF 24-O. The ANF 24-O provides an audible message to the user 46 that differs from the audible message provided by the ANF 24-N. Again, the audible message may be based on information contained in the instruction field 42 of the Petri-net message 30-7. The ANF 24-O receives an audible response from the user 46, and based on the audible response, generates a downstream Petri-net message 30, and communicates the downstream Petri-net 30 message to a downstream ANF 24. The ANF 24-O may then go into a wait, or disabled, state, awaiting the receipt of another Petri-net message 30.

Additional simulation activities associated with the entity 26-N during the multiple-entity scenario simulation may be simulated by other ANFs 24, such as an ANF 24-P. Each ANF 24 associated with the entity 26-N may, upon being enabled by the receipt of a Petri-net message 30, provide an audible message to the user 46, receive from the user 46 an audible response, and generate and communicate a downstream Petri-net message 30. Thus, the user 46 may be integrated into the multiple-entity scenario simulation such that the user 46 plays the role of the entity 26-N throughout the simulation.

Figure 7:
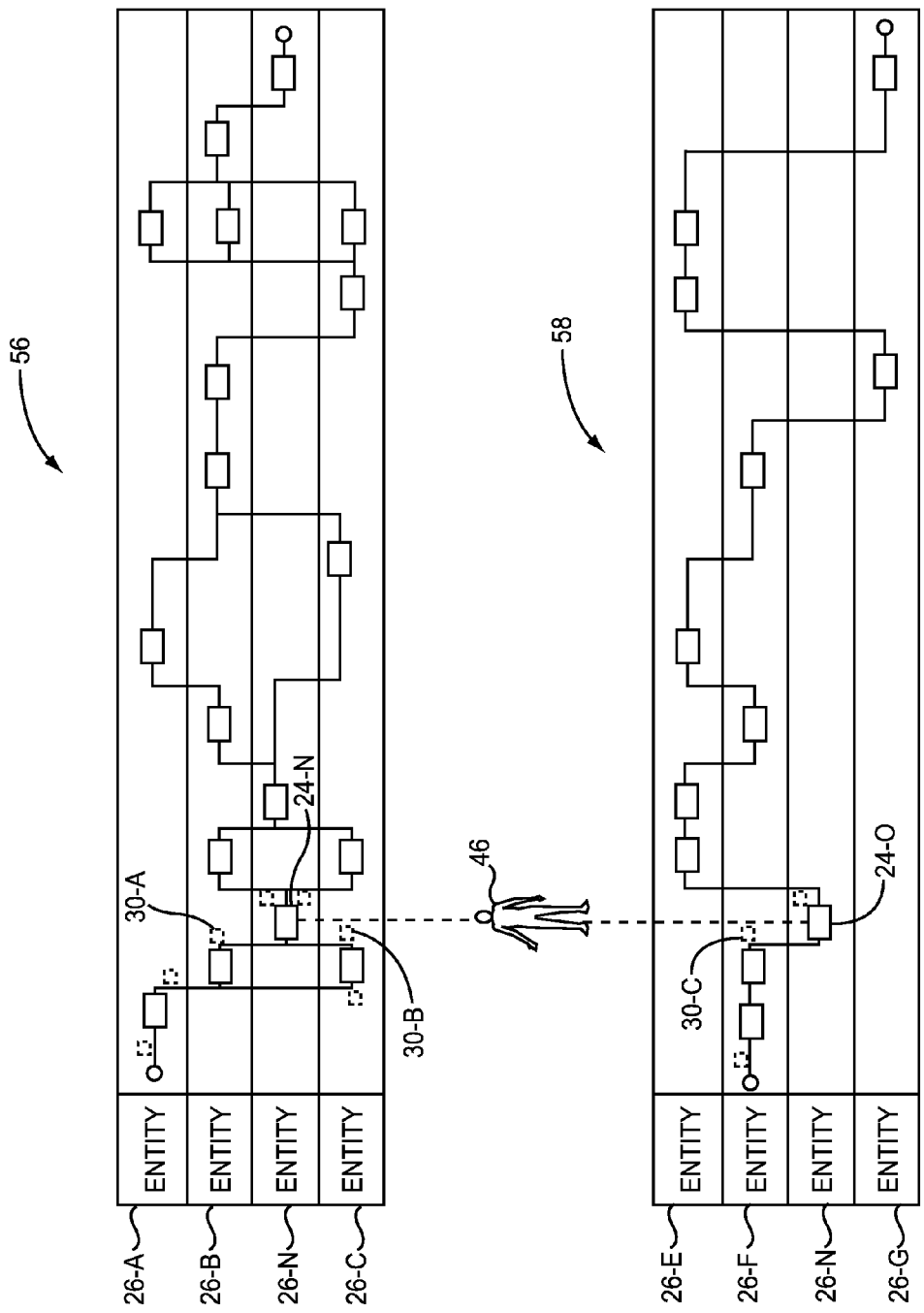
FIG. 7 is a block diagram illustrating Petri-net message flow among ANFs in two example multiple-entity scenario simulations executing concurrently, wherein a user is incorporated into both multiple-entity scenario simulations according to one embodiment.

FIG. 7 is a block diagram illustrating a Petri-net message flow among ANFs in two example multiple-entity scenario simulations executing concurrently, wherein the user 46 is incorporated into both multiple-entity scenario simulations according to one embodiment. In this embodiment, a first multiple-entity scenario simulation 56 of a first executable architecture relates to a fire at a chemical site, and a second multiple-entity scenario simulation 58 of a second executable architecture relates to a fire at a residence. Entities involved in the first multiple-entity scenario simulation 56 include entities 26-A, 26-B, 26-N, and 26-C. Entities involved in the second multiple-entity scenario simulation 58 include entities 26-E, 26-F, 26-N, and 26-G. Assume for purposes of illustration that the entity 26-N is a fire department command and control center, and in both multiple-entity scenario simulations 56, 58, at one or more points in time, the fire department command and control center has an activity that is to be simulated. The simulation of the activities in both multiple-entity scenario simulations 56, 58 is implemented by ANFs 24-N and 24-O, respectively. Thus, at a first point in time during the first multiple-entity scenario simulation 56, the ANF 24-N receives Petri-net messages 30-A and 30-B, and upon receipt of both Petri-net messages 30-A and 30-B, becomes enabled. The ANF 24-N provides a first audible message to the user 46 based on the instruction field 42 in the Petri-net message 30-A or 30-B. The ANF 24-N receives a first audible response, and based on the response, generates a downstream Petri-net message 30 and communicates the downstream Petri-net message 30 to a downstream ANF 24.

At a second point in time during the second multiple-entity scenario simulation 58, which may be prior to, substantially concurrent with, or subsequent to the first point in time, the ANF 24-O receives a Petri-net message 30-C, and upon receipt of the Petri-net message 30-C, becomes enabled. Petri-net messages 30 generated in the first multiple-entity scenario simulation 56 may be distinguished from Petri-net messages 30 generated in the second multiple-entity scenario simulation 58 by, for example, a simulation identifier field contained in the Petri-net messages 30. In this manner, the ANF 24-N may determine that for the first multiple-entity scenario simulation 56, both the Petri-net messages 30-A and 30-B are required to become enabled. In the second multiple-entity scenario simulation 58, the receipt of the single Petri-net message 30-C will cause the ANF 24-O to become enabled.

In response to receiving the Petri-net message 30-C, the ANF 24-O provides a second audible message to the user 46 based on the instruction field 42 in the Petri-net message 30-C. The second audible message may be different from the first audible message provided in the first multiple-entity scenario simulation 56. The ANF 24-O receives a second audible response, and based on the second audible response, generates a downstream Petri-net message 30 and communicates the downstream Petri-net message 30 to a downstream ANF 24.

Thus, the ability to execute a plurality of multiple-entity scenario simulations concurrently may provide the user 46 with realistic training wherein the user 46 is facilitating command and control of multiple different fires during substantially the same time frame. In other embodiments, the same multiple-entity scenario simulation of an executable architecture may be played multiple times concurrently, with different sets of Petri-net messages 30 associated with each such multiple-entity scenario simulation. In such embodiment, a scenario instance identifier may be added to each Petri-net message 30 to distinguish multiple simultaneous scenarios from each other. In some embodiments, the ANF 24 may include a first-in-first-out queue to process Petri-net messages 30. The Petri-net messages 30 may include a priority override indicator to cause some Petri-net messages 30 to be processed prior to others.

Figure 8:
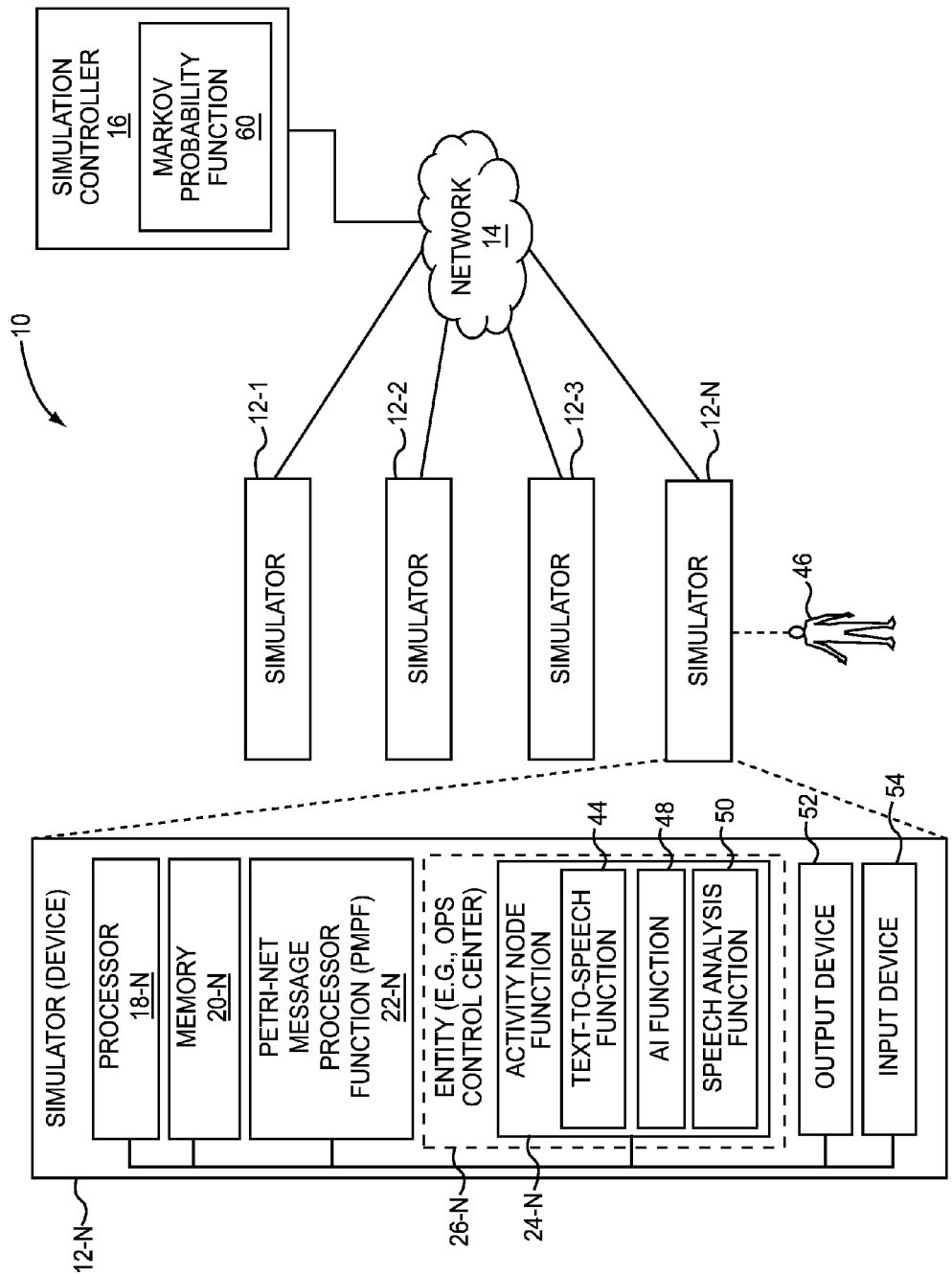
FIG. 8 is a block diagram of a simulation system according to another embodiment.

FIG. 8 is a block diagram of the simulation system 10 according to another embodiment. In this embodiment, a Markov probability function 60 may be utilized to implement variable processing based on Markov probabilities. In particular, in one embodiment, Markov probabilities may be obtained or otherwise determined by monitoring repetitive instances of the execution of given executable architectures, or portions of executable architectures, to see what messages might be sent from a given ANF 24 and what activities are performed. Over multiple simulations, users may choose different actions offered by the ANF 24. With sufficient exposure to the choices made by users, a set of probabilities of what action may be taken at one ANF 24 can be established, and can be programmed into that particular ANF 24 for simulations wherein a user is not available and is instead being simulated by an ANF 24. In this way, such Markov probabilities implement variety to different multiple-entity scenario simulations of the same executable architecture.

In one embodiment a Markov probability function 60 enables the use of Markov-modeled probabilities during a multiple-entity scenario simulation of an executable architecture. One or more of the ANFs 24 may contain particular Markov-modeled probabilities, and may generate a random number that is used to choose a particular output Petri-net message 30 and destination ANF 24, or action and response. Multiple different ANFs 24 may each have a set of Markov probabilities that direct their next action.

Figure 9:
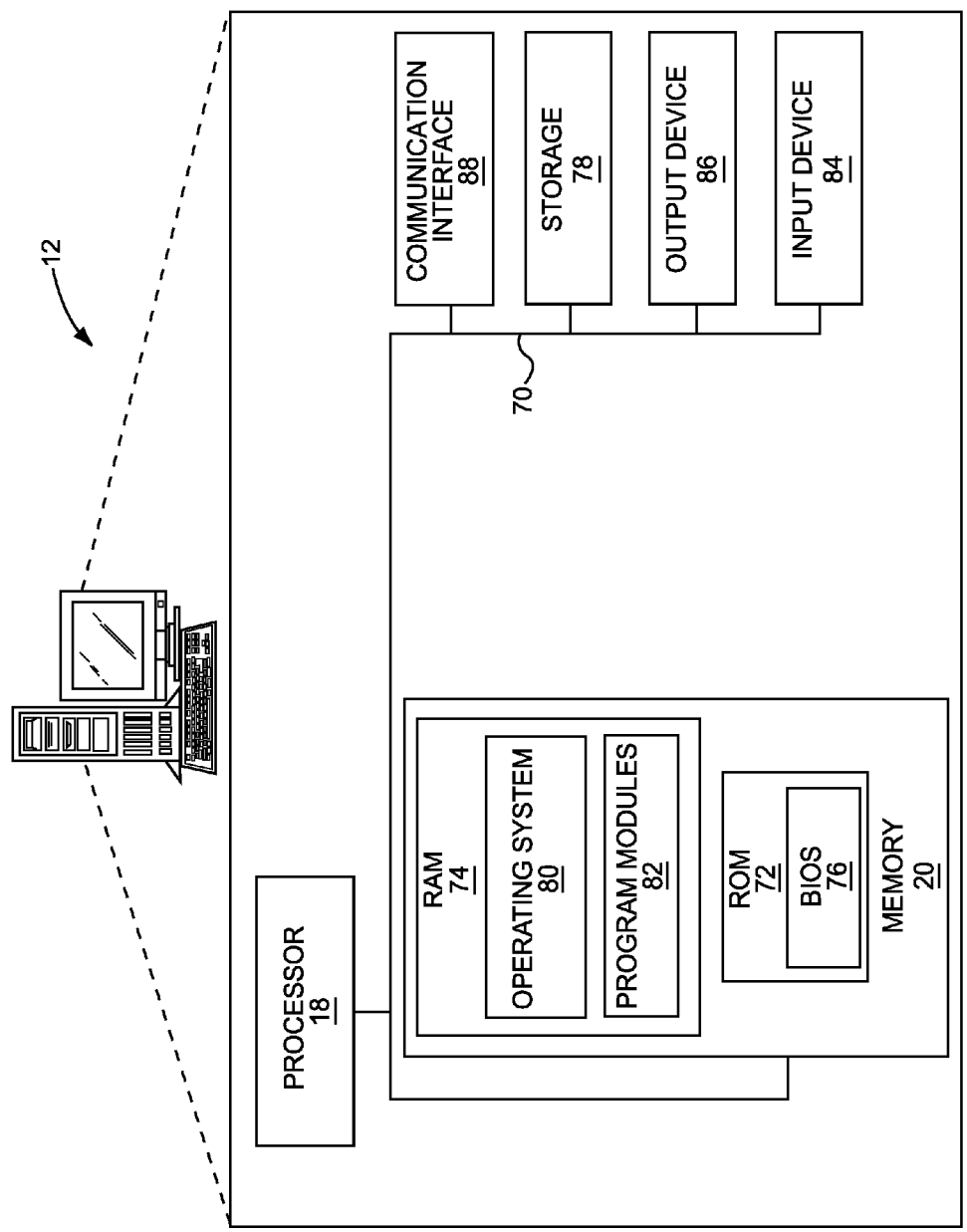
FIG. 9 is block diagram of a simulator according to one embodiment.

FIG. 9 is a block diagram of the simulator 12 according to one embodiment. The simulator 12 may comprise any computing or processing device capable of executing software instructions to implement the functionality described herein, such as a work station, a desktop or laptop computer, a tablet computer, a special purpose simulator, a game console, or the like. The simulator 12 includes the processor 18, the memory 20, and a system bus 70. The system bus 70 provides an interface for system components including, but not limited to, the memory 20 and the processor 18. The processor 18 can be any commercially available or proprietary processor. Dual microprocessors and other multi-processor architectures may also be employed as the processor 18.

The memory 20 may include non-volatile memory 72 (e.g., read only memory (ROM), erasable programmable read only memory (EPROM), electrically erasable programmable read only memory (EEPROM), etc.) and/or volatile memory 74 (e.g., random access memory (RAM)). A basic input/output system (BIOS) 76 may be stored in the non-volatile memory 72, and can include the basic routines that help to transfer information between elements within the simulator 12. The volatile memory 74 may also include a high-speed RAM, such as static RAM for caching data.

The simulator 12 may further include a computer-readable storage 78, which may comprise, for example, an internal hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 78 and other drives, associated with computer-readable and computer-usable media, provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of modules can be stored in the computer-readable storage 78 and in the volatile memory 74, including an operating system 80 and one or more program modules 82, which may implement the functionality described herein in whole or in part, including, for example, functionality associated with the PMPF 22 and ANFs 24, and other processing and functionality described herein. It is to be appreciated that the embodiments can be implemented with various commercially available operating systems 80 or combinations of operating systems 80.

All or a portion of the embodiments may be implemented as a computer program product stored on a transitory or non-transitory computer-usable or computer-readable storage medium, such as the computer-readable storage 78, which includes complex programming instructions, such as complex computer-readable program code, configured to cause the processor 18 to carry out the steps described herein. Thus, the computer-readable program code can comprise software instructions for implementing the functionality of the embodiments described herein when executed on the processor 18. The processor 18, in conjunction with the program modules 82, may serve as a control system for the simulator 12 that is configured to, or adapted to, implement the functionality described herein.

The user 46 may be able to enter commands and information into the simulator 12 through one or more input devices 84, such as, for example, a keyboard (not illustrated), a pointing device such as a mouse (not illustrated), or a touch-sensitive surface (not illustrated). Other input devices (not illustrated) may include a microphone, an infrared (IR) remote control, a gesture recognition system, a joystick, a game pad, a stylus pen, or the like. An output device 86 may provide audible messages and other audible sounds to the user 46, and may comprise, for example, a headset, speakers, or the like.

The simulator 12 may also include a communication interface 88 suitable for communicating with the network 14.

Those skilled in the art will recognize improvements and modifications to the preferred embodiments of the present disclosure. All such improvements and modifications are considered within the scope of the concepts disclosed herein and the claims that follow.

What is claimed is:

1. A simulator for simulating an entity comprising:
    a communication interface configured to communicate with a network;
    a processor coupled to the communication interface and configured to:
        implement a Petri-net message processor function (PMPF) and a first activity node function (ANF);
        receive, by the PMPF, a first Petri-net message from a source ANF, the first Petri-net message comprising a simulation activity identifier that identifies a first simulation activity of a first entity to be simulated in a first multiple-entity scenario simulation;
        route, by the PMPF, the first Petri-net message to the first ANF based on the simulation activity identifier; and
        receive, by the first ANF, the first Petri-net message, and in response to receipt of the first Petri-net message:
            determine, by the first ANF, that the receipt of the first Petri-net message changes a state of the first ANF from a wait state to an enabled state, wherein the enabled state indicates that the first simulation activity is to be simulated by the first ANF via interaction with a user;
            in response to being in the enabled state, provide a message to the user;
            receive from the user a response to the message;
            generate a second Petri-net message based on the response;
            communicate the second Petri-net message to a destination ANF to trigger a second simulation activity by the destination ANF; and
            place the first ANF in the wait state.

2. The simulator of claim 1, wherein the processor is further configured to:
    subsequent to communicating the second Petri-net message to the destination ANF, set, by the first ANF, the first ANF to a wait state.

3. The simulator of claim 1, wherein to determine that the receipt of the first Petri-net message places the first ANF in the enabled state, the processor is further configured to:
    determine, by the first ANF, that the first Petri-net message comprises a final Petri-net message of a plurality of Petri-net messages required to place the first ANF in the enabled state.

4. The simulator of claim 1, wherein the processor is further configured to:
    implement a first plurality of ANFs, including the first ANF, each ANF in the first plurality of ANFs being associated with an entity of a plurality of entities in the first multiple-entity scenario simulation, and wherein the processor is further configured to:
    route, by the PMPF, the first Petri-net message to the first ANF of the first plurality of ANFs based on the simulation activity identifier.

5. The simulator of claim 4, wherein the processor is further configured to:
    implement a second ANF of the first plurality of ANFs, wherein the processor is further configured to:
        receive, by the PMPF, a third Petri-net message from the source ANF, the third Petri-net message comprising a second simulation activity identifier that identifies a second simulation activity of the first entity in the first multiple-entity scenario simulation, the second simulation activity being different from the first simulation activity;
        route, by the PMPF, the third Petri-net message to the second ANF based on the second simulation activity identifier; and
        receive, by the second ANF, the third Petri-net message, and in response to receipt of the third Petri-net message:
            provide a second message to the user, the second message being different from the first message;
            receive from the user a second response to the second message;
            generate a fourth Petri-net message based on the second response; and
            communicate the fourth Petri-net message to a destination ANF.

6. The simulator of claim 1, wherein the source ANF is associated with a source entity of a plurality of entities in the first multiple-entity scenario simulation, and the destination ANF is associated with a destination entity of the plurality of entities in the first multiple-entity scenario simulation.

7. The simulator of claim 1, wherein the processor is further configured to:
    receive, by the first ANF, an audible question from the user prior to receiving the response; and
    provide an audible answer to the user based on the audible question.

8. The simulator of claim 1, wherein the destination ANF is identified by the user in the response to the message.

9. The simulator of claim 1, wherein the processor is further configured to:
    receive, by the PMPF, a third Petri-net message from a different source ANF, the third Petri-net message comprising a second simulation activity identifier that identifies a simulation activity of the first entity in a second multiple-entity scenario simulation that is executing in parallel with the first multiple-entity scenario simulation;
    route, by the PMPF, the third Petri-net message to a second ANF based on the second simulation activity identifier; and
    receive, by the second ANF, the third Petri-net message, and in response to receipt of the third Petri-net message:
        provide a second message to the user;
        receive from the user a second response to the second message;
        generate a fourth Petri-net message based on the second response; and
        communicate the fourth Petri-net message to a different destination ANF.

10. The simulator of claim 1, wherein the source ANF executes on a source simulator coupled to the network, and the first Petri-net message is received by the simulator from the source simulator via the network.

11. The simulator of claim 1, wherein the processor is further configured to implement the source ANF, the source ANF being associated with a source entity that is different from the first entity.

12. The simulator of claim 1, wherein the message provided to the user comprises an audible message.

13. The simulator of claim 12, wherein the response received from the user comprises an audible response.

14. A method, comprising:
receiving, by a Petri-net message processor function (PMPF), a first Petri-net message from a source activity node function (ANF), the first Petri-net message comprising a simulation activity identifier that identifies a first simulation activity to be simulated;
routing, by the PMPF, the first Petri-net message to a first ANF based on the simulation activity identifier; and
receiving, by the first ANF, the first Petri-net message, and in response to receipt of the first Petri-net message:
determining, by the first ANF, that the receipt of the first Petri-net message changes a state of the first ANF from a wait state to an enabled state, wherein the enabled state indicates that the first simulation activity is to be simulated by the first ANF via interaction with a user;
in response to being in the enabled state, providing a message to the user;
receiving from the user a response to the message;
generating a second Petri-net message based on the response;
communicating the second Petri-net message to a destination ANF to trigger a second simulation activity by the destination ANF; and
placing the first ANF in the wait state.

15. The method of claim 14, wherein determining that the receipt of the first Petri-net message places the first ANF in the enabled state further comprises:
determining, by the first ANF, that the first Petri-net message comprises a final Petri-net message of a plurality of Petri-net messages required to place the first ANF in the enabled state.

* * * * *